US009438283B2

(12) United States Patent
Kesling et al.

(10) Patent No.: US 9,438,283 B2
(45) Date of Patent: Sep. 6, 2016

(54) BASEBAND TIME DOMAIN CANCELLATION OF DATA BUS INTERFERENCE

(71) Applicant: INTEL CORPORATION, Santa Clara, CA (US)

(72) Inventors: William Dawson Kesling, Davis, CA (US); Hossein Alavi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/286,452

(22) Filed: May 23, 2014

(65) Prior Publication Data

US 2015/0341061 A1 Nov. 26, 2015

(51) Int. Cl.
*H04B 1/10* (2006.01)
*H04B 1/12* (2006.01)

(52) U.S. Cl.
CPC .............. *H04B 1/10* (2013.01); *H04B 1/1036* (2013.01); *H04B 1/123* (2013.01)

(58) Field of Classification Search
CPC ..... H04B 1/10; H04B 1/001; H04L 27/2691; H04L 25/03006; H04L 27/148; H04L 27/2334
USPC .......................................... 375/346, 348, 350
See application file for complete search history.

(56) References Cited

U.S. PATENT DOCUMENTS

| | | | | |
|---|---|---|---|---|
| 6,496,531 B1 * | 12/2002 | Kamel et al. | ................. | 375/130 |
| 6,771,934 B2 * | 8/2004 | Demers et al. | .............. | 455/63.1 |
| 6,917,642 B1 * | 7/2005 | Rouphael et al. | ............ | 375/140 |
| 7,349,482 B2 * | 3/2008 | Kim | ............................... | 375/260 |
| 7,551,678 B2 * | 6/2009 | Kiyanagii | ................ | H04B 7/10 375/260 |
| 7,573,943 B2 * | 8/2009 | Cioffi | ............................ | 375/260 |
| 7,773,703 B2 * | 8/2010 | Laroia et al. | .................. | 375/346 |
| 7,792,203 B2 * | 9/2010 | Liu | ...................... | H04L 25/0232 375/260 |
| 7,796,698 B2 * | 9/2010 | Koorapaty et al. | ........... | 375/260 |
| 7,889,802 B2 * | 2/2011 | Yamagata | ............... | H04L 27/22 375/260 |
| 7,907,690 B2 * | 3/2011 | Taylor et al. | .................. | 375/350 |
| 7,940,864 B2 * | 5/2011 | Merched et al. | ............. | 375/316 |
| 8,223,737 B2 * | 7/2012 | Nangia | .................. | H04L 5/0007 370/310 |
| 8,284,875 B2 * | 10/2012 | Park et al. | ..................... | 375/341 |
| 8,331,508 B2 * | 12/2012 | Dabiri | ........................... | 375/346 |
| 8,363,701 B2 * | 1/2013 | Won et al. | ..................... | 375/148 |
| 8,396,177 B1 * | 3/2013 | Morris | .......................... | 375/346 |
| 8,477,603 B2 * | 7/2013 | Sambhwani et al. | ......... | 370/229 |
| 8,593,934 B2 * | 11/2013 | Laudel | ............. | H04L 25/03019 370/204 |
| 8,718,565 B1 * | 5/2014 | Rai et al. | ...................... | 455/63.1 |
| 8,780,964 B2 * | 7/2014 | Subramanian et al. | ...... | 375/219 |
| 8,792,598 B1 * | 7/2014 | Cendrillon | ............. | H04B 1/109 375/346 |
| 8,811,514 B2 * | 8/2014 | Huang et al. | ................. | 375/267 |
| 8,861,663 B1 * | 10/2014 | Sedarat et al. | ................ | 375/350 |
| 8,885,567 B2 * | 11/2014 | Luo et al. | ..................... | 370/328 |
| 8,897,278 B2 * | 11/2014 | Kimura | ............... | H04L 27/2655 370/338 |
| 8,942,173 B2 * | 1/2015 | Li et al. | ........................ | 370/328 |
| 9,020,009 B2 * | 4/2015 | Barriac | ............. | H04B 7/15535 375/211 |

(Continued)

*Primary Examiner* — Emmanuel Bayard
(74) *Attorney, Agent, or Firm* — International IP Law Group, P.L.L.C.

(57) ABSTRACT

An apparatus that enables baseband time domain cancellation of data bus interference is described herein. The apparatus includes a wireless receiver and a cancellator. The cancellator is to determine an estimate of wireless interference in a baseband time domain on data to be received by the wireless receiver and to subtract the estimate of wireless interference from the data.

23 Claims, 7 Drawing Sheets

(56) References Cited

U.S. PATENT DOCUMENTS

| | | | |
|---|---|---|---|
| 9,020,023 B2* | 4/2015 | Takaoka | H04L 25/03159 375/229 |
| 9,064,388 B1* | 6/2015 | Razazian | H04B 3/542 |
| 2003/0107986 A1* | 6/2003 | Malkemes | H04L 27/2657 370/208 |
| 2006/0128347 A1* | 6/2006 | Piriyapoksombut et al. | 455/333 |
| 2007/0141992 A1* | 6/2007 | Kwa et al. | 455/63.1 |
| 2010/0189162 A1* | 7/2010 | Yoshimoto et al. | 375/141 |
| 2012/0045995 A1* | 2/2012 | Nakano et al. | 455/63.1 |
| 2012/0093240 A1* | 4/2012 | Mcfarland et al. | 375/257 |
| 2012/0164948 A1* | 6/2012 | Narasimha | H04W 72/1215 455/63.1 |
| 2012/0214524 A1* | 8/2012 | Wajcer | H04B 1/109 455/502 |
| 2012/0295605 A1* | 11/2012 | Sahin et al. | 455/422.1 |
| 2013/0072143 A1* | 3/2013 | Dabiri | 455/307 |
| 2013/0230089 A1* | 9/2013 | Hollis | 375/231 |
| 2013/0308581 A1* | 11/2013 | Rofougaran | 370/329 |
| 2013/0331114 A1* | 12/2013 | Gormley et al. | 455/452.1 |
| 2014/0003362 A1* | 1/2014 | Anand et al. | 370/329 |
| 2014/0044021 A1* | 2/2014 | Alberth et al. | 370/278 |
| 2014/0133523 A1* | 5/2014 | Xu et al. | 375/148 |
| 2014/0146765 A1* | 5/2014 | Ji et al. | 370/329 |
| 2014/0160973 A1* | 6/2014 | Ho et al. | 370/252 |
| 2014/0161048 A1* | 6/2014 | Attar et al. | 370/329 |
| 2014/0211741 A1* | 7/2014 | Panicker et al. | 370/329 |
| 2014/0219125 A1* | 8/2014 | Jia et al. | 370/252 |
| 2014/0233457 A1* | 8/2014 | Koutsimanis et al. | 370/328 |
| 2014/0328192 A1* | 11/2014 | Barriac et al. | 370/252 |
| 2014/0334440 A1* | 11/2014 | Wong et al. | 370/331 |
| 2015/0009794 A1* | 1/2015 | Damnjanovic et al. | 370/201 |
| 2015/0043687 A1* | 2/2015 | Luo et al. | 375/349 |
| 2015/0063196 A1* | 3/2015 | Nentwig | 370/312 |

* cited by examiner

100

600

BASEBAND TIME DOMAIN CANCELLATION OF DATA BUS INTERFERENCE

TECHNICAL FIELD

The present techniques relate generally to data bus interference. More specifically, the present techniques relate to removing data bus interference from a wireless signal.

BACKGROUND ART

Computing platforms such as computing systems, tablets, laptops, mobile phones, and the like include various data buses and interconnects. These data buses and interconnects can be the source of electromagnetic interference. The interference can corrupt wireless signals received by the platform. Metal shielding can be used to prevent electromagnetic interference from affecting wireless signals received by the platform.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
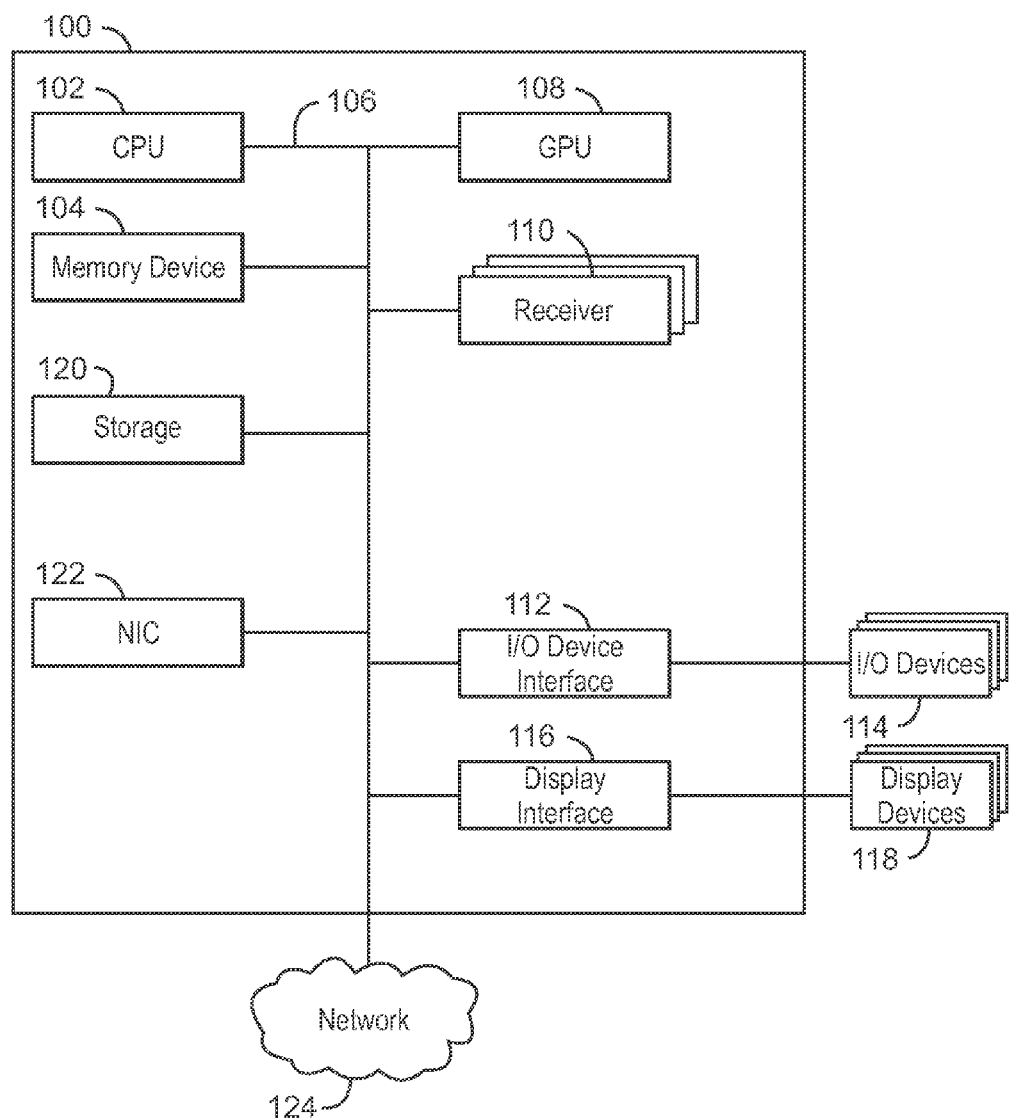
FIG. 1 is a block diagram of a computing device that may include a baseband time domain cancellation of data bus interference.

As system form factors have become smaller, radio frequency interference from data buses with wireless receiver operation in the same platform has become a significant issue in platform design. Metal shielding to prevent electromagnetic interference carries a significant cost in terms of bill of materials, product development time, and manufacturing complexity.

Embodiments described herein provide baseband time domain cancellation of data bus interference. Digital data from a data bus can be obtained and then used to estimate the interference that the data bus has on a radio signal received by the platform. This estimate of the interference is then subtracted from the radio signal in order to provide a clean radio signal. The cancellation or subtraction of interference is done in the baseband time domain of the radio signal. In this manner, the cancellation can be performed in a less complex manner when compared to cancelling interference at other domains of the signal.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present techniques. It will be apparent, however, to one skilled in the art that these specific details need not be employed to practice the present techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present techniques.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present techniques described herein.

FIG. 1 is a block diagram of a computing device 100 that may include a baseband time domain cancellation of data bus interference. The computing device 100 may be, for example, a laptop computer, desktop computer, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Bus 106 may include any known interconnect, such as multi-drop bus, a point-to-point interconnect, a serial interconnect, a parallel bus, a coherent (e.g. cache coherent) bus, a layered protocol architecture, a differential bus, and a GTL bus. Additionally, the CPU 102 can be a single core processor, a multi-core processor, a computing cluster, or any number of other configurations. Furthermore, the computing device 100 may include more than one CPU 102. The instructions that are executed by the CPU 102 may be used to cancel data bus interference. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100.

As more logic and devices are being integrated on a single die, such as system-on-chip (SOC), each of the components illustrated in FIG. 1 may be incorporated on CPU 102. For example in one embodiment, a memory controller hub is on the same package and/or die with CPU 102. Here, a portion of the core (an un-core portion) includes one or more controller(s) for interfacing with other devices such as memory device 104 or a GPU 108. The configuration including an interconnect and controllers for interfacing with such devices is often referred to as an un-core configuration. As an example, on-chip interface can include a ring interconnect for on-chip communication and a high-speed serial point-to-point link for off-chip communication. Yet, in the SOC environment, even more devices, such as the network interface, co-processors, memory device 104, GPU 108, and any other known computer devices/interface may be integrated on a single die or integrated circuit to provide small form factor with high functionality and low power consumption.

The bus 106 and any associated interconnects and links can generate electromagnetic interference. Although a single data bus is illustrated, there may be several data buses, interconnects, and links in a single computing device 100 that generate electromagnetic interference. The computing device 100 includes a plurality of receivers 110. The receivers 110 could be any number of receivers within the computing device 100. In some cases, the receivers 110 are coupled with the bus 106. The receivers 110 may capture data or a radio signal from a wireless transmitter. Accordingly, in some cases the receiver 110 is a radio receiver. The electromagnetic interference created by the data bus 106 may corrupt the radio signal captured by a receiver 110. In some cases, the electromagnetic interference created by the data bus 106 results in a total loss of data at the receiver 110. The present techniques can be used to cancel the electromagnetic interference created by the data bus 106, thereby enabling the receiver 110 to receive the correct signal from a wireless transmitter in another platform.

The CPU 102 may be connected through the bus 106 to an input/output (I/O) device interface 112 configured to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100.

The CPU 102 may also be linked through the bus 106 to a display interface 116 configured to connect the computing device 100 to a display device 118. The display device 118 may include a display screen that is a built-in component of the computing device 100. The display device 118 may also include a computer monitor, television, or projector, among others, that is externally connected to the computing device 100.

The computing device also includes a storage device 120. The storage device 120 is a physical memory such as a hard drive, an optical drive, a thumbdrive, an array of drives, or any combinations thereof. The storage device 120 may also include remote storage drives. The computing device 100 may also include a network interface controller (NIC) 122 may be configured to connect the computing device 100 through the bus 106 to a network 124. The network 124 may be a wide area network (WAN), local area network (LAN), or the Internet, among others. In some embodiments, the NIC 122 includes a transceiver that may also be affected by electromagnetic interference created by the data bus 106. The present techniques can be used to cancel the electromagnetic interference created by the data bus 106 to preserve the integrity of signals transmitted and received by the transceiver of the NIC 122.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

As discussed above, the electromagnetic interference created by a data bus within an electronic device can corrupt data or a radio signal received at a receiver or transceiver of the electronic device. The signals on the data bus can be processed in order to obtain an estimate of electromagnetic interference from the data bus. The estimated interference can then be removed from the data or radio signal received by the receiver or transceiver in order to maintain the integrity of the received data or signal. The estimated interference is removed in the baseband time domain of the radio signal.

Accordingly, the digital data being sent over a bus in a platform is simultaneously processed to provide a deterministic estimate of the wireless interference as it manifests in receiver's baseband time domain signal. Further, the digital data being sent over the data bus can be processed in real time to provide an estimate of the wireless interference. This estimate of the wireless interference generated by the data bus, interconnects, and or links is subtracted from the receiver's data or signal to provide clean data or a clean signal for further processing and recovery. Processing of the bus digital data to generate the estimate may reside in the bus physical layer (PHY), the receiver or radio PHY, or be partitioned between subsystems. A system interface is placed between the bus physical layer and the radio PHY. In some cases, this system interface uses an existing physical interface.

Figure 2:
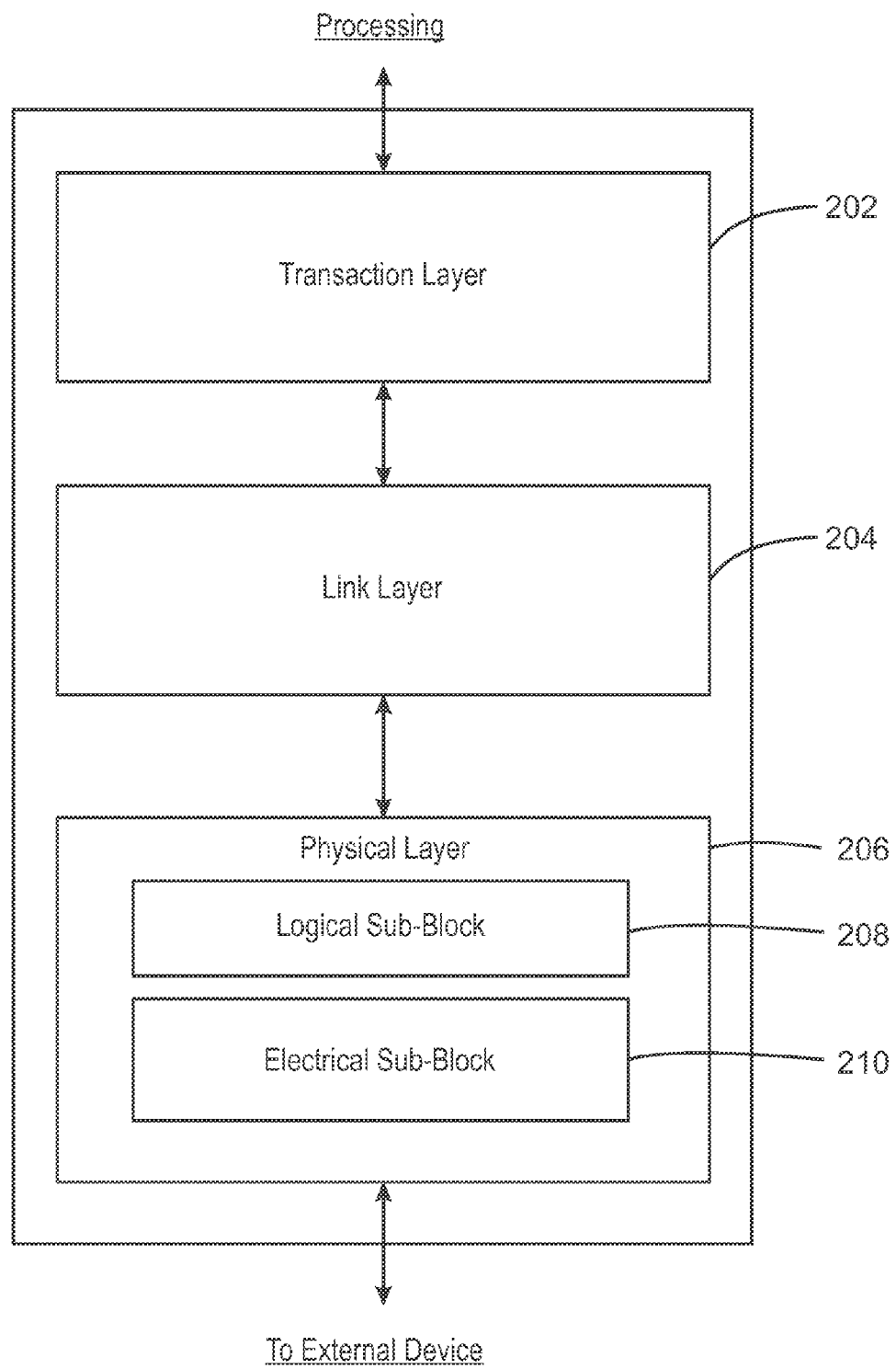
FIG. 2 illustrates an embodiment of an interconnect architecture with a layered stack.

FIG. 2 illustrates an embodiment of an interconnect architecture with a layered stack 200. In some cases, an on-die interconnect (ODI), which is not shown, can be used to couple internal units of the CPU 102 and can implements one or more aspects of the present techniques. In some cases, the present techniques are associated with a processor bus (e.g. Intel Quick Path Interconnect (QPI) or other known high performance computing interconnect), a high bandwidth memory path to memory, a point-to-point link to graphics accelerator (e.g. a Peripheral Component Interconnect express (PCIe) compliant fabric), a controller hub interconnect, an I/O or other interconnect (e.g. USB, PCI, PCIe) for coupling the other components, such as the components illustrated in FIG. 1. Some further examples of such components include an audio controller, firmware hub (flash BIOS), legacy I/O controller containing user input and keyboard interfaces, and a serial expansion port such as Universal Serial Bus (USB).

Communications using any of the interconnects or buses described above can generate interference that can corrupt wireless communications within a system. In some cases, electromagnetic induction or electromagnetic radiation from the interconnects used to couple various components within a system may alter wireless signals received by the platform. Each of the data buses and interconnects within a system may include a layered communication stack 200 that includes a transaction layer 202, link layer 204, and a physical layer 206. In examples, the transaction layer 202 is to provide an interface between a device's processing core and the interconnect architecture, such as the link layer 204 and physical layer 206. The link layer 204, also referred to as the data link layer, can acts as an intermediate stage between the transaction layer 202 and the physical layer 206. The physical layer 206 may physically transmit packets of data.

In some cases, the physical layer 206 includes a logical sub-block 208 and electrical sub-block 210 to physically transmit a packet to an external device. In the present scenario, the logical sub-block 208 is responsible for the "digital" functions of the physical layer 206. In this regard, the logical sub-block 208 includes a transmit section to prepare outgoing information for transmission by the physical sub-block 206, and a receiver section to identify and prepare received information before passing it to the link layer 204.

The electrical sub-block 210 of the physical layer 206 can include a transmitter and a receiver. The transmitter is supplied by the logical sub-block 208 with symbols, which the transmitter serializes and transmits onto to an external device. The receiver is supplied with serialized symbols from an external device and transforms the received signals into a bit-stream. The bit-stream is de-serialized and supplied to the logical sub-block 208. In embodiments, the bit-stream from the physical layer of the data bus or interconnect is used to generate an estimate of the radio signal interference created by the data bus or interconnect. This estimate is then used to cancel interference from a wireless signal received by a computing system.

Figure 3:
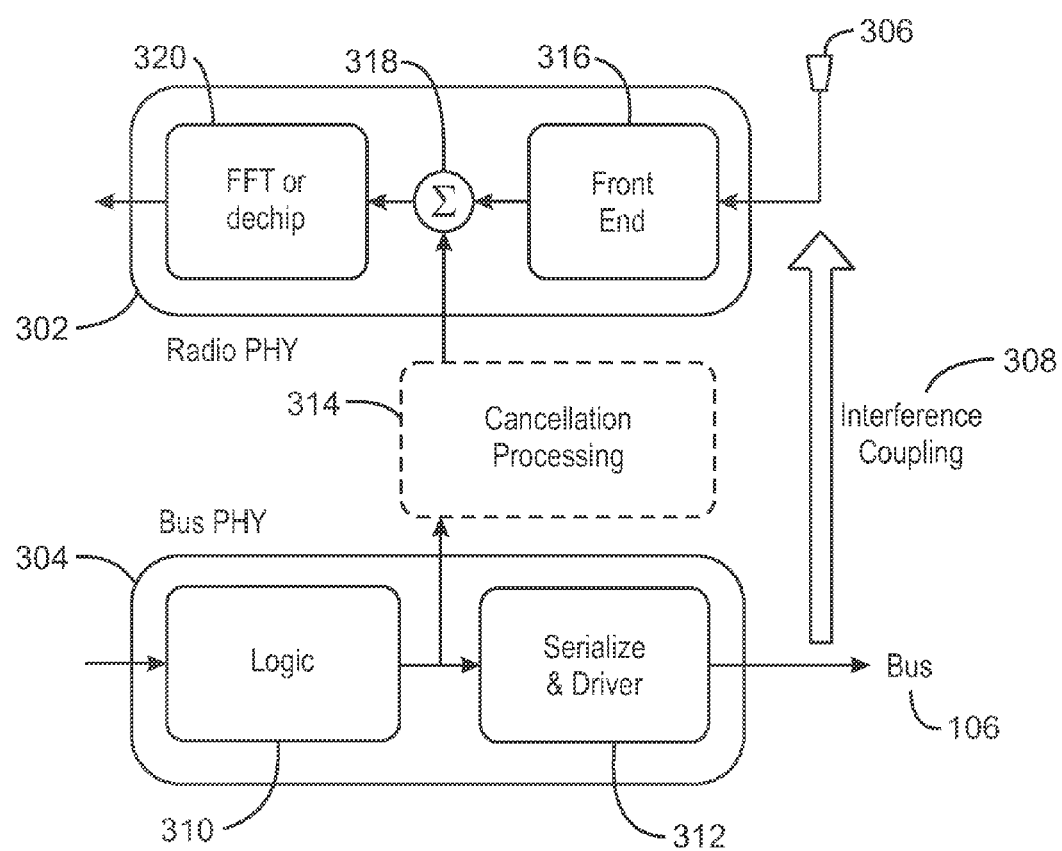
FIG. 3 is an illustration of baseband time domain cancellation of data bus interference using the physical layer of the data bus and radio.

FIG. 3 is an illustration of baseband time domain cancellation of data bus interference using the physical layer of the data bus and radio. The physical layer of each component includes the basic hardware of each component, coordinates bit-level transmission between different components, and supports electrical or mechanical interfaces connecting to the component to synchronize communication between components. FIG. 3 includes a radio physical layer 302 and a bus physical layer 304. An antenna 306 may send data via a radio signal to the radio physical layer 302.

The data bus 106 may be the source of electromagnetic interference 308. In some cases, the electromagnetic interference 308 is an interference coupling that corrupts the radio signal sent to the radio physical layer 302. The bus physical layer 304 may include a logic section 310 and a serialize and driver section 312, which roughly correspond to the logical sub-block 208 and electrical sub-block 210 in FIG. 2. In some cases, the digital representation of the bus signal is used for the cancellation processing 314. Since a digital representation of the bus signal is used, a bit sequence can be used for the cancellation processing, and the voltage waveform is not measured on the bus.

The data on the bus has a particular data rate, depending on the type of data bus. For example, a memory interface may be 1600 megabits (MB) per second per data lane. Measuring the voltage of such a bus would include a large amount of excess data and circuitry in order to obtain the data from the bus. By using a bit sequence instead of a voltage waveform, data can be measured at the bit rate using no analog to digital conversions. The logic section 310 is provides digital data functions. The serialize and driver section 312 is used to serialize bit data and drive the voltage waveform on the bus.

After the data leaves the logic section 310 for the data bus 106, cancellation processing 314 may analyze the signal bound for the data bus 106 in order to obtain an estimate of electromagnetic interference 308 that may result from the data bus 106. In some scenarios, cancellation processing is performed by a cancellator. Simultaneously, the radio signal from the antenna 306 signal may be sent from the antennae 306 to a front end 316 of the radio physical layer 302. In some cases, the front end 316 is a portion of the receiver that provides as output a baseband representation of the radio signal from the antennae 306. Accordingly, the front end may include performing down conversion, which takes the high frequency radio signal and translates it to a lower frequency signal for processing by the remaining components of the radio physical layer 302. Moreover, the front end 316 may include a high gain radio signal amplifier, filters, and the like. A summing portion 318 in the radio physical layer 302 may take as input an estimate of electromagnetic interference from the cancellation processing 316 and the baseband representation of the radio signal, and provides as output a clean or denoised signal that has had at least some electromagnetic interference that results from the data bus 106 removed. The baseband representation of the radio signal is a signal that has been translated to a lower frequency signal by the front end 316. A Fast Fourier Transform (FFT) or dechip (despreading) portion 320 can be used with orthogonal frequency-division multiplexing (OFDM) and direct sequence spread spectrum (DSSS) depending on the radio modulation used with the radio signal sent from the antennae 306. OFDM is an encoding technique where digital data is encoded onto multiple carrier frequencies. DSSS is a technique used to modulate the radio signal. In some cases, the cancellation processing removes the effect of electromagnetic interference from a signal that has passed through the FFT or dechip portion 320.

The present techniques enable an integrated electronic solution with improved bill of materials cost, as well as system development predictability and manufacturability when compared to shielding solutions. Further, the present techniques are self-adapting to work in different platforms and physical system configurations. Moreover, when compared to frequency domain cancellation techniques, the present techniques enable lower complexity digital signal processing, fewer filter taps, and no requirements for special synchronization with incoming radio symbols. In some cases, the present techniques has a higher immunity to bus jitter than other shielding techniques, and are able to cancel much larger interference levels. Additionally, the present techniques are immune to high radio error rates.

Figure 4:
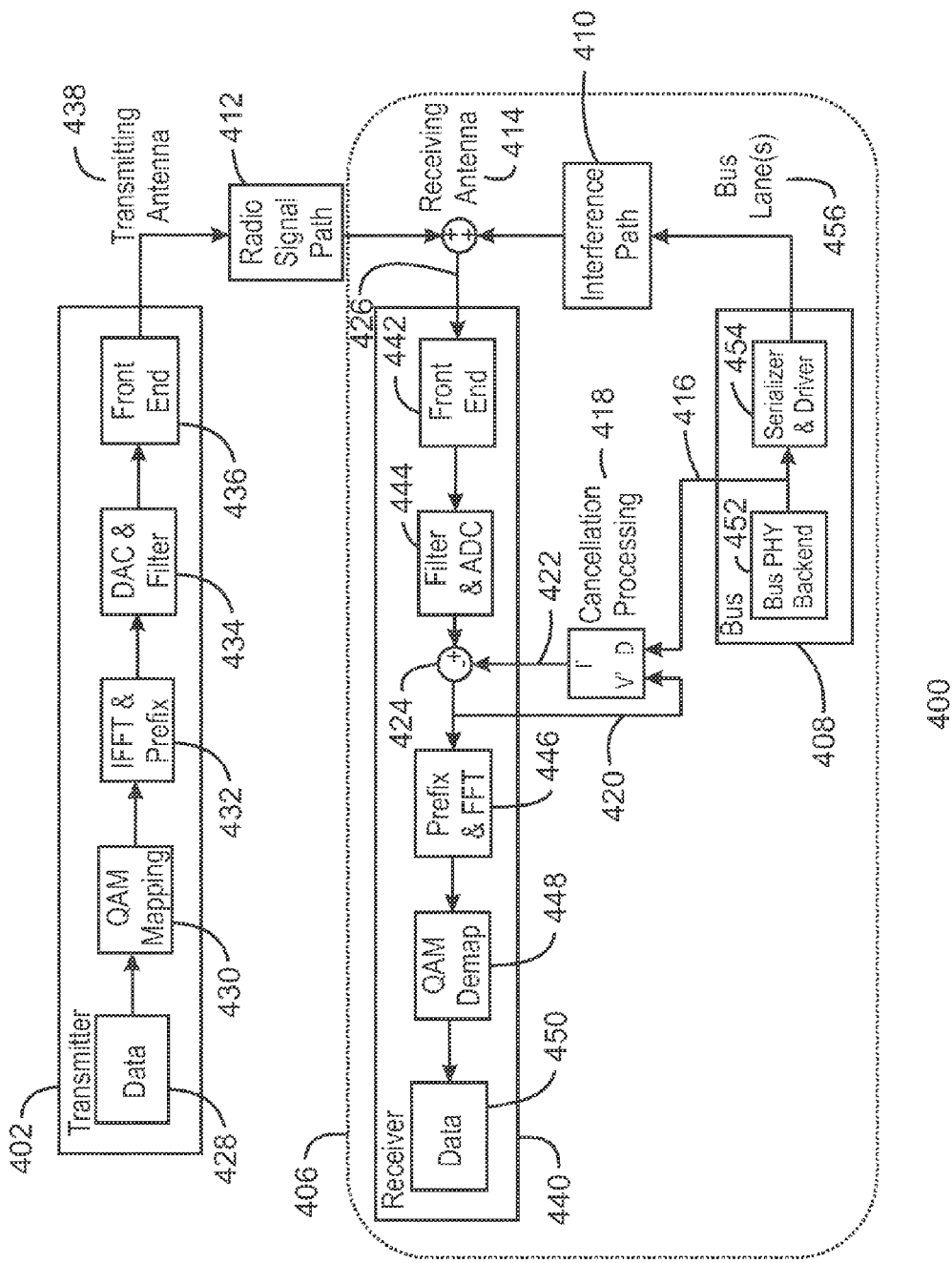
FIG. 4 is an example of baseband time domain cancellation of a data bus interference path.

FIG. 4 is an example 400 of baseband time domain cancellation of a data bus interference path. A transmitter 402 may be used to transmit a signal 414 to a platform 406. In some cases, the transmitter 402 is a cell phone tower, a WiFi hotspot, and the like. Accordingly, the transmitter 402 could be any device that sends a wireless signal to another device. A platform 406 may be similar to the electronic device 100 (FIG. 1). The platform 406 may be any electronic device that receives wireless signals. A data bus 408 within the platform 406 can generate electromagnetic interference 410 which corrupts a radio signal 412 received by the platform 406 at an antenna 414. To mitigate interference from the data bus, digital data 416 is taken from the data bus 408 to a cancellation processing portion 418 where it is processed along with a baseband signal V' 420 to create an estimate 422 of the interference. The estimate 422 is an estimate of the interference which appears in the radio's baseband time domain signal. At a summation portion 424, the estimate 422 is subtracted from the down-converted version of a signal 426, where the signal 426 includes electromagnetic interference 410 and a radio signal 412. In some cases, the summation portion 424 is a subtractor, as it performs subtraction to remove wireless interference from the data or radio signal 412. After the summation portion 424, the signal 420 is a baseband time domain representation of the radio signal 412, with reduced interference from the data bus 408. This signal 420 is used to adjust or optimize the interference estimate 422.

The transmitter 402 and platform 406 are an example of a SISO (single input single output) OFDM (orthogonal frequency division multiplexing) QAM (quadrature amplitude modulation) radio link. However, the present techniques works equally well with other types of systems, such as MIMO (multiple in multiple out), DSSS (direct sequence spread spectrum) and PSK (phase shift keying) systems. SISO OFDM QAM is used as a specific example, and should not be viewed as limiting the present techniques. For example, the transmitter 402 in this block diagram can represent part of a WiFi access point or 4G cellular base station. The corresponding receiver of the access point or base station is not illustrated. Data to be transmitted is represented by the data portion 428. The data from the data portion 428 is mapped to a quadrature amplitude modulation (QAM) constellation by the QAM Mapping portion 430. The signal at this point can be referred to as a frequency domain baseband signal. The resulting QAM constellation values are assigned to OFDM carriers by the Inverse Fast Fourier Transform (IFFT) & Prefix portion 432. The IFFT & Prefix portion 432 performs an inverse Fast Fourier Transform (IFFT) and adds cyclic prefix to the signal. The signal can now be referred to as a digital time domain baseband signal. This digital signal is then converted to an analog signal by a digital-to-analog converter (DAC) and filtered in the digital-to-analog (DAC) & Filter portion 434. The signal can now be referred to as an analog baseband signal. This analog baseband signal is then provided to the Front End portion 436 where it is up-converted to a radio frequency signal and amplified for transmission by the transmitters antenna at reference number 438.

In examples, the receiver 440 in the platform 406 can represent part of a WiFi or 4G radio in a notebook computer, tablet or smart phone. The corresponding transmitter of the WiFi or 4G radio is not illustrated. Radio signals propagate from radio transmitters such as transmitter 402 along some radio signal path 412 and arrive at the receiver's antenna 414, which is represented by a summation block. The Front End portion 442 amplifies the incoming radio signal from the radio signal path 412 from the receiver's antenna 414 and down-converts it to an analog baseband signal. The analog baseband signal is filtered and converted to a digital signal by an analog-to-digital converter (ADC) and Filter & ADC portion 444. This digital time-domain baseband signal is where the effect of bus interference is largely removed by the present techniques in this example. The improved signal has the cyclic prefix removed and is converted to a frequency-domain baseband signal by the Prefix & Fast Fourier Transform (FFT) portion 446. The resulting QAM constellation values are converted back to digital data by the QAM Demap portion 448. At the data portion 450, the resulting digital data will match the data that was originally sent by the transmitter if the complete system is working properly.

The bus 408 can represent the transmitting portion of any one of several data buses that are present in portable electronic systems such as notebook computers, tablets or smart phones. The corresponding receiving portion of the data bus is not illustrated. Example buses can include a DDR memory bus, PCI Express bus, Universal Serial Bus, or Mobile Industry Processor Interface bus. The Bus physical layer backend portion 452 represents the digital logic circuits typically present in the physical layer of such buses and roughly corresponding to reference numbers 208 and 310 in FIGS. 2 and 3, respectively. Data to be sent over the bus is provided by this block to the Serializer & Driver 454 where the data is serialized and driven onto the bus lane(s) 456 with the proper signal characteristics. When the data is serialized, it is converted from wide digital words processed at a relatively slow rate to narrower words at a faster rate.

The digital bus data in FIG. 4 is used to remove radio frequency interference at the baseband time domain stage of a wireless receiver. FIG. 4 illustrates cancellation being done in the digital domain of the baseband time domain. This enables for a purely digital cancellation implementation. In some cases, cancellation can be done upstream of the ADC portion 444 in the analog domain. By performing the cancellation in the analog domain, ADC design constraints otherwise imposed by the need to tolerate interference can be relaxed.

Figure 5:
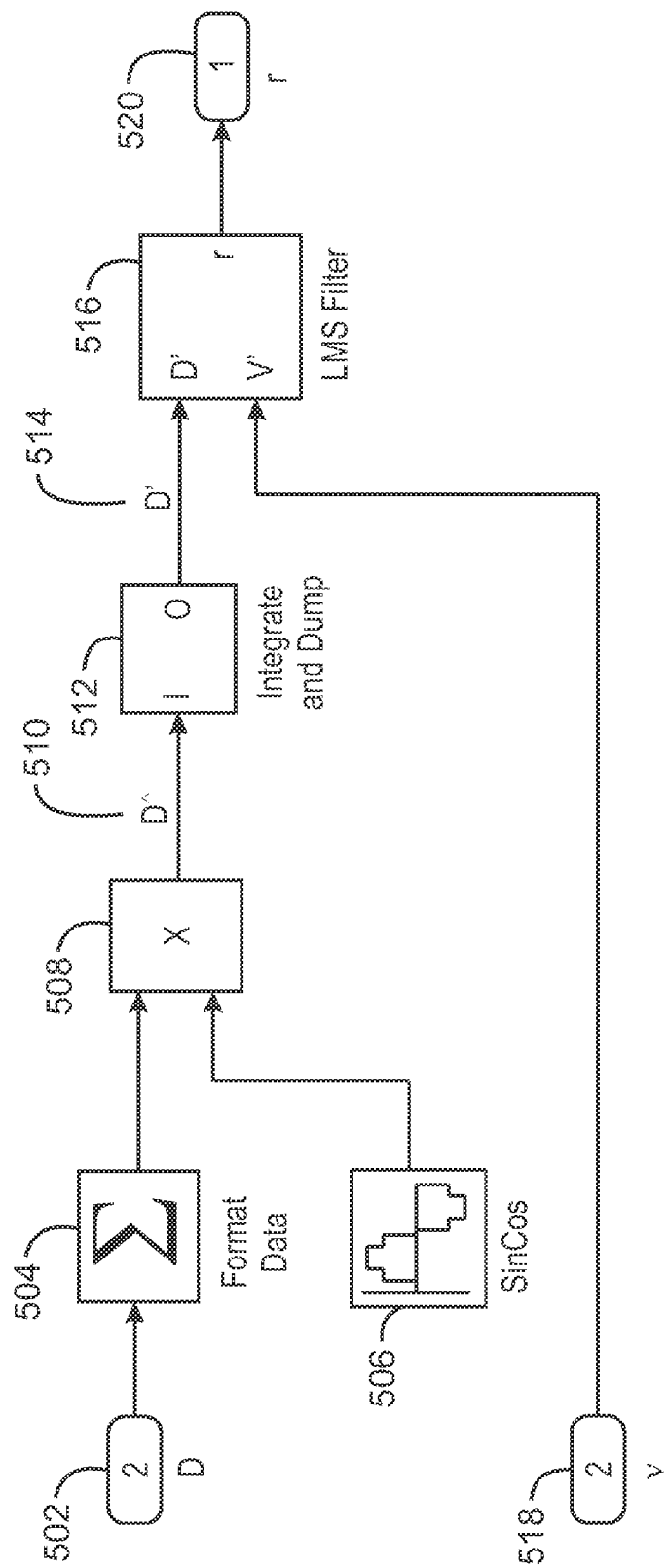
FIG. 5 is an illustration of a cancellation processing block.

FIG. 5 is an illustration of a cancellation processing block 500. In some cases, the cancellation processing block 500 is a cancellator. This cancellation portion can be partitioned between the bus physical layer and the radio physical layer as desired for optimum implementation. FIG. 5 illustrates cancellation being done in the digital domain of the baseband time domain. This enables for a purely digital cancellation implementation providing for low power and computer aided design. Cancellation can also be done in the analog baseband domain, which provides for relaxing the ADC design constraints imposed by the need to tolerate interference.

The digital bus data 502 present at the "D" (data) input may have a different bus path width and rate than the width and rate found on the bus itself. The Format Data portion 504 realigns the individual bits of data to represent the width, order, and rate that they will be when placed on the bus lane(s). The bit values that will be present on multiple lanes of the bus can also be added together where appropriate to represent the net interference source.

The Sin Cos portion 506 generates sub-sampled digital representations of radio frequency sine and cosine waveforms. The sample rate can conveniently be the same as the bus lane bit rate, or something lower than the bus lane bit rate. The signals from the Sin Cos portion 506 are multiplied at 508 by the formatted data from the Format Data portion 504 to determine the effect of a frequency spectrum component of the data at the radio frequency on the down-converted interference that is present in the receiver's time domain baseband. The multiplication by sampled sine and cosine waveforms can be understood in terms of a discrete time Fourier transform, or as a digital signal processing equivalent to quadrature mixing. The resulting signal can be interpreted as a complex vector and is labeled "D^" at reference number 510.

The Integrate and Dump portion 512 accumulates the value of D^ over an interval of time that may be equal to the radio receiver's digital time-domain baseband sample rate. The result, D' at reference number 514, is filtered to generate an estimate of the interference caused by the bus signal as it is seen in the radio receiver's baseband time-domain signal.

The filtering is accomplished by a Least Mean Squares (LMS) Filter portion 516 block. The purpose of the filtering is to match the effects on the actual interference as it traverses through the bus driver(s), interference path, radio receiver's front end and the radio receiver's baseband filtering up to the cancellation point in the receiver. These effects are unknown a priori, but an optimal filter match can be obtained using well-known adaptive filtering techniques. The adaptation of the filter parameters for best match to the actual interference is driven by the optimized version of the receivers baseband time domain signal itself, labeled "V'" at reference number 518. A conventional least-mean-square adaptation algorithm can be used to do this, for example. The filter can be periodically adapted or continuously updated as particular applications require. Although an LMS filter is illustrated in the cancellation block 500, other filter types are possible.

The output of the LMS filter 516 represents an estimate of the interference 520 resulting from the bus. Accordingly, the adaptive filter, by looking at the source of the interference and the result of the interference at the cancellation can determine what the interference coupling path does within a platform, and can also generate the I' to subtract off of the corrupted radio signal.

In some cases, the operation of the cancellation block is contingent upon power considerations of the system. If the interference path does not change frequently, then the filter can be set without having to change the parameters of the filter often. However, in tablets, notebooks, and laptops, external factors such as the hands of the user and proximity to surfaces can constantly change the interference coupling path. In such cases, the LMS should either continuously run or be periodically adaptive.

By cancelling the interference from bus data, computing devices have a greatly reduced dependence on signal acquisition functions such as frequency lock, equalization and symbol synchronization. Noise can be cancelled during radio signal acquisition rather than only afterwards. Moreover, the cancellation is done very close to radio front end, relaxing the design and performance impact on downstream signal path blocks. In some cases, the present techniques are suited for cancelling interference arising from data buses which connect to radio components themselves, since the cancellation interface can be kept internal to the radio silicon and easily support higher DSP rates. RFIC's (radio frequency integrated circuits), BB (baseband) processors and AP's (application processors) are examples of such components.

Figure 6:
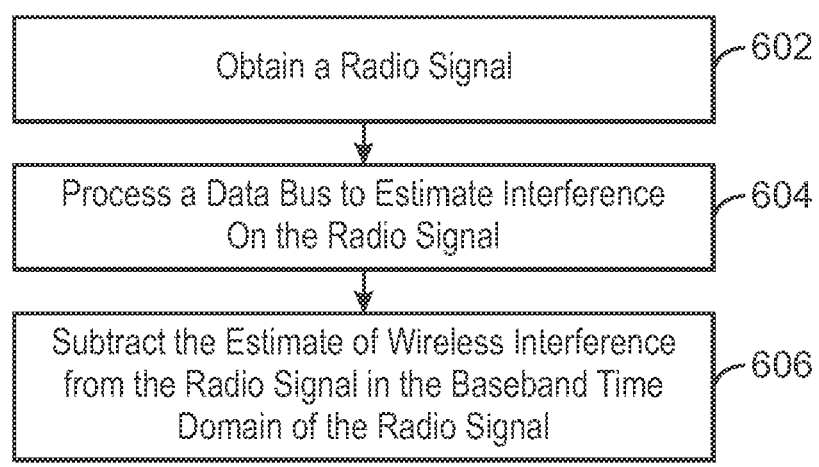
FIG. 6 is a process flow diagram of a method for baseband time domain cancellation of data bus interference.

FIG. 6 is a process flow diagram of a method 600 for baseband time domain cancellation of data bus interference. At block 602, a radio signal is obtained. The radio signal is captured using an antenna. At block 604, a data bus is processed to estimate interference on the radio signal. Digital data from the data bus is used to calculate the estimate of the interference on the radio signal. At block 606, the interference is subtracted from the radio signal in the baseband time domain of the radio signal. In this manner, a clean radio signal can be provided to a receiver.

Figure 7:
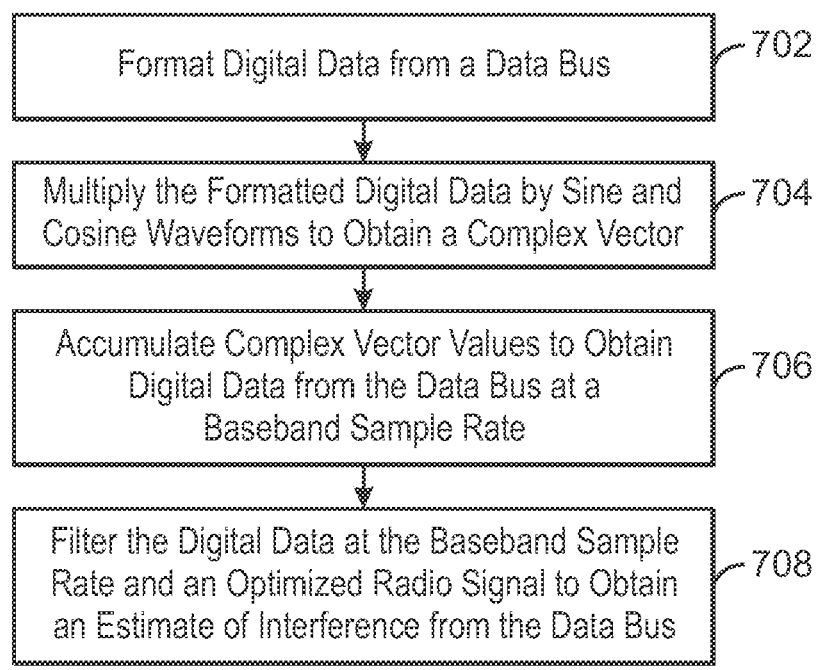
FIG. 7 is a process flow diagram of a method of estimating the interference from a data bus within a platform.

FIG. 7 is a process flow diagram of a method 700 of estimating the interference from a data bus within a platform. At block 702, digital data is formatted from the data bus. At block 704, the formatted digital data is multiplied by sine and cosine waveforms to obtain a complex vector. At block 706, complex vector values are accumulated to obtain digital data from the data bus at a baseband sample rate. At block 708, the digital data at the baseband sample rate and an optimized radio signal are filtered to obtain an estimate of interference on the radio signal.

EXAMPLE 1

An apparatus that enables cancellation of data bus interference is described herein. The apparatus includes a wireless receiver and a cancellator. The cancellator is to determine an estimate of wireless interference in a baseband time domain on data to be received by the wireless receiver and to subtract the estimate of wireless interference from the data.

The cancellator can determine the estimate of wireless interference on the data using digital data from a data bus of the apparatus. The estimate of wireless interference may be subtracted from the data by a subtractor. Additionally, the cancellator may determine a baseband time domain signal of the data to be received by the wireless receiver, wherein the baseband time domain signal is used to adjust the estimate of wireless interference to match effects of the bus interference coupling path and other signal path components. The cancellator may also subtract the estimate of wireless interference from the data in a digital domain of the baseband time domain. Also, the cancellator may subtract the estimate of wireless interference from the data upstream of an analog-to-digital converter in an analog domain. The cancellator may be partitioned between a bus physical layer and a radio physical layer.

EXAMPLE 2

A system that enables cancellation of data bus interference is described herein. The system includes a wireless receiver, a bus, a memory and a processor. The memory that is to store instructions and that is communicatively coupled to the wireless receiver and the bus. The processor is communicatively coupled to the bus and the memory. When the processor is to execute the instructions, the processor is to calculate an estimate of radio frequency interference in a signal at a baseband time domain stage of the wireless receiver, wherein the interference is from digital data of a data bus. The processor is also to remove the radio frequency interference due to digital bus data.

The processor may calculate the radio frequency interference by analyzing the digital data intended for the data bus.

The data bus may generate electromagnetic interference, which corrupts the signal to be received by the wireless receiver. A cancellation block may calculate an estimate of radio frequency interference. The radio frequency interference removed from the system may be from a data bus connected to radio components of the system. The radio frequency interference removed from the system may be subtracted from a receiver baseband radio signal. Removing the radio frequency interference may cancel noise in the radio signal during signal acquisition. Calculating the radio frequency interference and removing the radio frequency interference may occur at a bus physical layer, a radio physical layer, or be partitioned between the bus physical layer and the radio physical layer. A system interface may be generated between a bus physical layer and a radio physical layer to calculate the radio frequency interference and remove the interference in the radio physical layer. The system interface may be an existing physical interface.

EXAMPLE 3

A method for baseband time domain cancellation of data bus interference is described herein. The method includes obtaining a radio signal and processing a data bus to estimate interference on the radio signal. The method also includes subtracting the interference from the radio signal in the baseband time domain of the radio signal.

A baseband radio signal may be used to adjust the estimated interference such that effects of a bus interference coupling path and other signal path components are matched. Subtracting the interference from the radio signal may cause the interference to be cancelled from the wireless radio signal. Additionally, subtracting the interference from the radio signal may be performed upstream of an analog-to-digital converter in the analog domain. The radio signal may be processed to calculate the estimate of interference from the data bus. Further, processing the data bus to estimate interference on the radio signal includes cancellation processing.

Cancellation processing may includes formatting digital data from the data bus and multiplying the formatted digital data by sine and cosine waveforms to obtain a complex vector. Cancellation processing may also include accumulating complex vector values to obtain digital data from the data bus at a baseband sample rate, and filtering the digital data at the baseband sample rate using an optimized radio signal to obtain an estimate of interference on the radio signal. Accumulating the complex vector values may include accumulating the complex vector values over an interval of time that is equal to a radio receivers digital time-domain baseband sample rate. Multiplying the formatted digital data by sine and cosine waveforms to obtain a complex vector may be used to enable quadrature mixing. Moreover, formatting digital data from the data bus may determine a frequency spectrum component of the digital data at a radio frequency on a down-converted interference that may be present in a receiver's time domain baseband. Filtering may be performed by a least mean squares (LMS) filter, filtering may be performed by a filter that is periodically adapted or continuously updated.

EXAMPLE 4

An apparatus that enables cancellation of data bus interference is described herein. The apparatus includes a wireless receiver. The apparatus also includes a means to estimate wireless interference on data received by the wireless receiver from a data bus using digital data from the data bus.

The wireless interference may appear in the wireless receiver's baseband time domain signal. The wireless interference may be used to adjust the estimate to match effects of a bus interference coupling path and other signal path components. Further, the means to estimate wireless interference may perform cancellation in the baseband time domain. Additionally, the means to estimate wireless interference may perform cancellation of the wireless interference upstream of an analog-to-digital converter in an analog domain. The means to estimate wireless interference may be partitioned between a bus physical layer and a radio physical layer, or the means to estimate wireless interference may include a least mean square adaptive filter. The means to estimate wireless interference may format and filter the digital data from the data bus to match the down-converted interference that may be present in the receivers time domain baseband. Also, the digital data may be processed in real time to estimate the wireless interference.

While the present techniques have been described with respect to a limited number of embodiments, those skilled in the art will appreciate numerous modifications and variations there from. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus that enables cancellation of data bus interference, the apparatus comprising:
    a wireless receiver;
    a cancellator to determine an estimate of wireless interference in a baseband time domain on data to be received by the wireless receiver and to subtract the estimate of wireless interference from the data.

2. The apparatus of claim 1, wherein the cancellator is to determine the estimate of wireless interference on the data using digital data from a data bus of the apparatus.

3. The apparatus of claim 1, wherein the estimate of wireless interference is to be subtracted from the data by a subtractor.

4. The apparatus of claim 1, wherein the cancellator is to determine a baseband time domain signal of the data to be received by the wireless receiver, wherein the baseband time domain signal is used to adjust the estimate of wireless interference.

5. The apparatus of claim 1, wherein the cancellator is to subtract the estimate of wireless interference from the data in a digital domain of the baseband time domain.

6. The apparatus of claim 1, wherein the cancellator is to subtract the estimate of wireless interference from the data upstream of an analog-to-digital converter in an analog domain.

7. The apparatus of claim 1, wherein the cancellator is partitioned between a bus physical layer and a radio physical layer.

8. A system that enables cancellation of data bus interference, comprising:
   a wireless receiver;
   a bus;
   a memory that is to store instructions and that is communicatively coupled to the wireless receiver and bus; and
   a processor communicatively coupled to the bus and the memory, wherein when the processor is to execute the instructions, the processor is to:
      calculate an estimate of radio frequency interference in a signal at a baseband time domain stage of the wireless receiver, wherein the interference is from the bus; and
      remove the radio frequency interference due to digital bus data.

9. The system of claim 8, wherein the processor is to calculate the radio frequency interference by analyzing the digital data of the data bus.

10. The system of claim 8, wherein the data bus is to generate electromagnetic interference, which corrupts the signal to be received by the wireless receiver.

11. The system of claim 8, wherein a cancelation block is to calculate an estimate of radio frequency interference.

12. The system of claim 8, wherein the radio frequency interference removed from the system is from a data bus connected to radio components of the system.

13. The system of claim 8, wherein the radio frequency interference removed from the system is subtracted from a baseband radio signal of the wireless receiver.

14. The system of claim 8, wherein to remove the radio frequency interference is to cancel noise in the radio signal during signal acquisition.

15. The system of claim 8, wherein to calculate the radio frequency interference and to remove the radio frequency interference is to occur at a bus physical layer, a radio physical layer, or be partitioned between the bus physical layer and the radio physical layer.

16. The system of claim 8, wherein a system interface is to be generated between a bus physical layer and a radio physical layer to calculate the radio frequency interference and remove the interference in the radio physical layer.

17. A method for baseband time domain cancellation of data bus interference, comprising:
   obtaining a radio signal;
   processing a data bus to estimate interference on the radio signal; and
   subtracting the interference from the radio signal in the baseband time domain of the radio signal.

18. The method of claim 17, wherein a baseband radio signal is used to adjust the estimated interference such that effects of a bus interference coupling path and other signal path components are matched.

19. The method of claim 17, wherein subtracting the interference from the radio signal causes the interference to be cancelled from the wireless radio signal.

20. The method of claim 17, wherein subtracting the interference from the radio signal is performed upstream of an analog-to-digital converter in the analog domain.

21. The method of claim 17, wherein the radio signal is processed to calculate the estimate of interference from the data bus.

22. The method of claim 17, wherein processing the data bus to estimate interference on the radio signal includes cancellation processing, comprising:
   formatting digital data from the data bus;
   multiplying the formatted digital data by sine and cosine waveforms to obtain a complex vector;
   accumulating complex vector values to obtain digital data from the data bus at a baseband sample rate; and
   filtering the digital data at the baseband sample rate using an optimized radio signal to obtain an estimate of interference on the radio signal.

23. The method of claim 22, wherein accumulating the complex vector values includes accumulating the complex vector values over an interval of time that is equal to a radio receiver's digital time-domain baseband sample rate.

* * * * *